United States Patent [19]

Runge

[11] Patent Number: 4,512,630
[45] Date of Patent: Apr. 23, 1985

[54] OPTICAL FIBER CONNECTOR

[75] Inventor: Peter K. Runge, Fair Haven, N.J.

[73] Assignee: AT&T Bell Laboratories, Murray Hill, N.J.

[21] Appl. No.: 125,941

[22] Filed: Feb. 29, 1980

Related U.S. Application Data

[63] Continuation of Ser. No. 630,930, Nov. 11, 1975, abandoned.

[51] Int. Cl.³ .............................................. G02B 7/26
[52] U.S. Cl. .................................................. 350/96.21
[58] Field of Search ............... 350/96.20, 96.21, 96.22; 156/158

[56] References Cited

U.S. PATENT DOCUMENTS

| | | | |
|---|---|---|---|
| 3,455,625 | 7/1969 | Brumley et al. | 350/96.22 |
| 3,484,398 | 12/1969 | Childs | 260/18 R |
| 3,504,984 | 4/1970 | Bush | 350/96.22 X |
| 3,734,594 | 5/1973 | Trambarulo | 350/96.21 |
| 3,810,802 | 5/1974 | Buhite et al. | 156/158 |
| 3,870,395 | 3/1975 | Schicketanz | 350/96.21 |
| 3,902,785 | 9/1975 | Matthews | 350/96.21 |
| 3,904,269 | 9/1975 | Lebduska et al. | 350/96.22 |
| 3,914,880 | 10/1975 | Dakss et al. | 350/96.21 |
| 3,922,064 | 11/1975 | Clark et al. | 350/96.22 |
| 3,944,328 | 3/1976 | Kent et al. | 350/96.21 |
| 3,948,582 | 4/1976 | Martin | 350/96.21 |
| 3,958,861 | 5/1976 | Roberts | 350/96.21 |
| 3,963,323 | 6/1976 | Arnold | 350/96.21 |
| 3,984,174 | 10/1976 | Landgreen | 350/96.22 |
| 3,999,837 | 12/1976 | Bowen et al. | 350/96.22 |
| 4,076,376 | 2/1978 | Slaughter | 350/96.21 |
| 4,107,242 | 8/1978 | Runge | 350/96.21 X |

FOREIGN PATENT DOCUMENTS 2425798  1/1975  Fed. Rep. of Germany ... 350/96.20

OTHER PUBLICATIONS

Watt, "Silicone Liquid Rubbers", *Chemistry in Britain*, vol. 6, No. 12, Dec. 1970, pp. 519-524.
Cohen et al., "Microlenses for Coupling Junction Lasers to Optical Fibers", *Applied Optics*, vol. 13, No. 1, Jan. 1974, pp. 89-94.
"Fibre Optic Connectors—An Effective Solution", *Electronic Engineering*, Apr. 1975, p. 55.
"Information About Electrical/Electronic Materials", Dow-Corning Publication, undated, 3 pp.

*Primary Examiner*—John Lee
*Attorney, Agent, or Firm*—Sylvan Sherman; David R. Padnes

[57] ABSTRACT

In a disconnectable low-loss optical connection for optical fibers, each fiber in a pair of optical fibers is surrounded by a connector body to the conical frustum mating end of which is applied a tiny, transparent, flexible index matching dome of silicone rubber or equivalent material. The connector bodies are held together by mating to each other or to a common alignment receptacle having conically hollow receiving surfaces, so that the fiber ends are aligned and the domes touch and flex completing the optical connection.

2 Claims, 10 Drawing Figures

OPTICAL FIBER CONNECTOR

This is a continuation of application Ser. No. 630,930, filed Nov. 11, 1975, (now abandoned).

BACKGROUND OF THE INVENTION

The present invention relates to devices and techniques in the field of guided wave transmission of light through optical waveguides. More specifically, the present invention relates to the structure and method of manufacture of a device for connecting and disconnecting ends of optical fiber waveguides.

In recent years, significant advances have been made in the technology of transmitting information with low loss by light beams through thread-like optical glass fibers. The use of light as a medium of communication is of great commercial interest since optical fibers promise much more channel capacity than microwave waveguides and electrically conducting transmission wires. The fibers are inexpensive and compact, and they are compatible with transmitters, repeaters and receivers of miniature size.

As optical transmission systems have developed, the need has increased for an inexpensive device for connecting and disconnecting optical fibers to facilitate insertion, removal, and testing of network components. Such a connector should be relatively small, convenient to use, require little maintenance, and offer little obstruction, or loss, to the passage of light through its structure.

Discontinuities in the refractive index of the light path contribute to light loss. To reduce the loss a substance is often placed between the fiber ends which is such as to have a refractive index which matches the index of the light path in the fibers. Unfortunately, index matching in the prior art has been accomplished by liquids having obvious maintenance disadvantages and by adhesives not readily disconnectable without some step such as heating.

Furthermore, when the optical fiber end diameters are on the order of 0.1 millimeter or less, precise alignment of the ends and close approach are also required for low light loss. Heretofore, many optical connector devices have required tedious adjustment to achieve alignment and close approach of the ends.

SUMMARY OF THE INVENTION

The maintenance disadvantages and connectability inconveniences of prior art fiber optic connectors are now avoided in the present invention by the principle of flexible interfacing. In the invention each fiber end is provided with a transparent, flexible protective contact body of silicone rubber or equivalent material so that runny liquids are unnecessary. A fiber alignment holder makes the fiber ends collinear for low loss. The contact bodies located on two fiber ends are brought and held together so that they touch and flex, completing the optical connection. Disconnection is accomplished by a mere reverse motion interrupting physical contact so that the flexible material assumes the unflexed shape. In this manner the invention avoids the disadvantages associated with the use of adhesives as well. When the contact bodies are substantially indexmatched to the fibers, discontinuities are eliminated and light loss is significantly reduced. Since the contact bodies are flexible, end separation tolerances of the fibers in the holder are not stringent.

In one feature of the invention which is especially advantageous when small-diameter fibers are involved, each optical fiber end is surrounded by an inexpensive epoxy or polyester molded connector body having a surface in the shape of a frustum aligned with the optical fiber core axis. The connector bodies are either shaped to be matable to each other or shaped for use with a connector body support having a pair of opposed frustum surfaces matable with the connector bodies. A tiny drop of silicone rubber, epoxy or equivalent material is applied to the fiber end to form the contact body which cures and also adheres to an adjacent portion of the connector body.

The unusual advantage of the frustum shape relates to practical considerations. Provision of mating surfaces in the shape of a frustum translates variations in physical size of the mating parts (due to manufacturing and temperature fluctuations) into fiber end separation variations, thus avoiding fiber end misalignment and consequent light loss. The end separation variations are no problem since they are compensated for by the flexible contact bodies. Consequently, the invention provides a quick-disconnect low loss optical fiber connector requiring no tedious adjustments to align even the smallest fibers.

Some of the many embodiments, features and advantages of the present invention are described in more detail hereinbelow in connection with the appended drawings.

DETAILED DESCRIPTION

Figure 1:
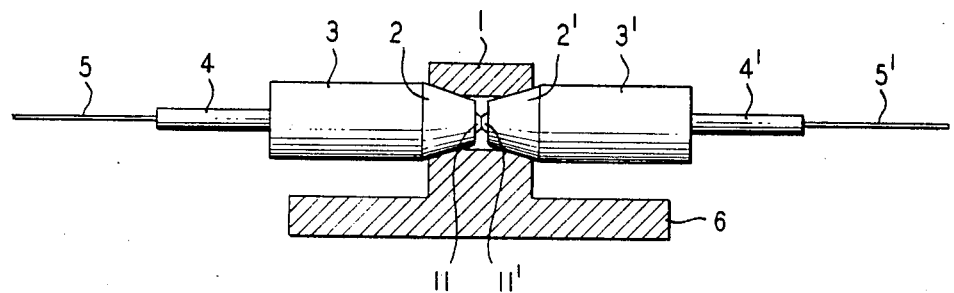
FIG. 1 is a partially cross sectional view of an optical fiber connector according to the invention showing two optical fiber connector subassemblies in connected position.

In FIG. 1, socket 1 supported by base 6 holds connector bodies 3 and 3', which have frustum-shaped mating surface portions 2 and 2' respectively opposably received in the socket. Connector bodies 3 and 3' surround optical fibers 5 and 5' which are supported by sleeves 4 and 4' respectively. The optical connection is made within socket 1 in a manner more clearly illustrated in magnification in FIGS. 2A and 2B.

Figure 2A:
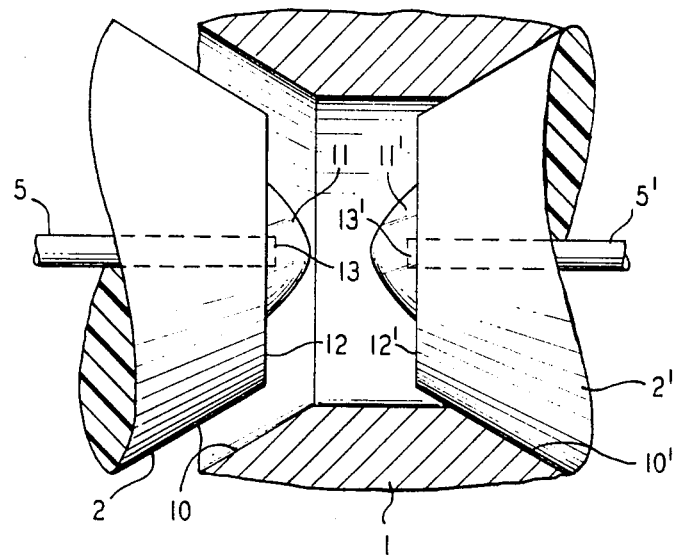
FIG. 2A is a magnified cross section of the invention in an optically disconnected state.

FIG. 2A shows conical frustum portions 2 and 2' and socket 1 just prior to completion of the optical connection. The frustum portions 2 and 2' have tips 12 and 12' respectively which surround the ends of optical fibers 5 and 5'. Optical fiber end faces 13 and 13' are exposed to each other in opposed orientation. End faces 13 and 13', as well as the adjacent parts of tips 12 and 12', are covered by clear, flexible, index matching, adhering contact body domes 11 and 11' respectively.

Figure 2B:
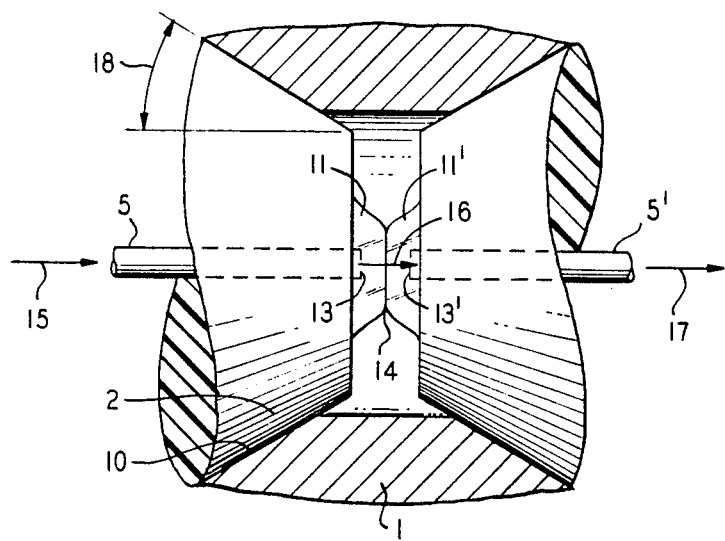
FIG. 2B is the corresponding cross section of the invention when optical connection is made.

Then optical connection is made as shown in FIG. 2B. Flexible domes 11 and 11' come together so that they touch and flex, completing the optical connection. At the same time frustum portion 2 comes into physical contact with matable receiving surface 10 of socket 1 so that the fiber ends are aligned collinear. A light ray 15 passing through the end of fiber 5 leaves end face 13 and passes into dome 11 with minimal reflection or loss when dome 11 is matched in refractive index with the light carrying path of fiber 5. The light, now indicated as ray 16, passes through dome 11 and enters dome 11' at a flexible interface or contact region 14. Again, light loss is negligible since there is no refractive index discontinuity at the interface, for instance when there is a "wetting" phenomenon thereat, as is observed microscopically. The light passes into end face 13' of fiber 5', continuing along fiber 5' as ray 17.

In the optical fiber connector of the invention, the apex half-angle 18 of the conical mating portion is selected to provide support for and secure alignment of the optical fiber ends. Generally speaking the appropriate apex half-angle 18 has a lower limit at which the mating surfaces illustrated by surfaces 2 and 10 become self-locking and an upper limit of about 45° at which surface 10 ceases to provide significant support for conical frustum portion 2. Portion 2 can also be a pyramidal frustum, and similar surface angle considerations apply.

In an experiment with a fiber optic connector devised according to the invention, it was found that an apex half-angle of about 10° provided excellent support without self-locking. Graded index multimode fibers having a 55 micron diameter core and a 110 micron diameter cladding were used. The axis of the core varied at most by 1.2 microns from the axis of the cladding outer surface. The connector was designed to reduce the angular misalignment of the cladding axes of the fiber ends relative to each other to less than 1° and the distance between the cladding axes to less than 3 microns. When the optical connection was completed, the nominal separation between the fiber end faces 13 and 13' was 30 microns. The width of the flexible domes 11 and 11' covering the fiber end faces 13 and 13' and the adjacent portions of tips 12 and 12' was approximately 5 fiber diameters. The substance of the domes covered the fiber end faces to a depth of 50 to 100 microns. In the connected state the substance was squeezed by a factor of more than 2 to 1 so that the end separation of 30 microns was achieved. The socket had two opposed, conically hollow, coaxial, receiving surfaces 10 and 10' machined from brass, and the connector bodies were composed of a transfer molded compound.

Tests of the light loss in the optical fiber connector just described were performed with a beam of coherent light from a helium-neon laser having a wavelength of approximately 0.63 microns. Each of many connector bodies 3' of FIG. 1 was rotated outside of socket 1 and reinserted at least six times against the dome 11 on a standard body 3 so that the worst case of transmission loss for each could be measured. A total of 198 dome-and-connector-body subassemblies were tested, and 90 percent of the connections had worst case transmission loss of 0.14 dB or less, eminently suitable for use in optical communications systems.

The success of this novel connector is attributable in large measure to the convenience of the index-matching contact body approach. Index-matching reduces transmission loss otherwise cause first by Fresnel reflection of some light from each fiber end face and, second, by diverging of the rest of the light by Fresnel refraction as it passes through an end face. If no index-matching were used, the transmission loss would be approximately 0.6 dB greater due to the Fresnel reflection and refraction effects associated with fibers of refractive index 1.5 in air.

However, the advantages of an optical fiber connector employing flexible interfacing are of even wider scope, especially when very small diameter optical fibers are involved, because the invention includes a novel method of manufacture of the special subassemblies of FIG. 1. The method aspect of the invention for making each connector body and dome subassembly lends itself readily to inexpensive precision alignment of even small diameter fibers in the connector body and application of the flexible dome so as to be practical for large scale commercial production and use in the field withut tedious adjustments. In the inventive method, broadly stated, the connector body is first made to surround the optical fiber end, and second, the contact body substance is applied to the fiber end face and cured flexible. Detailed features of this method disclosed hereinbelow will serve to suggest its scope.

Figure 3A:
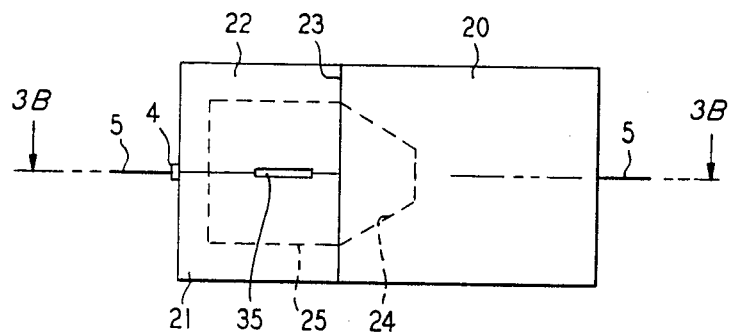
FIG. 3A is a simplified elevation view of three molding blocks in a molding assembly used in an embodiment of the inventive method of manufacturing an optical fiber connector.
Figure 3B:
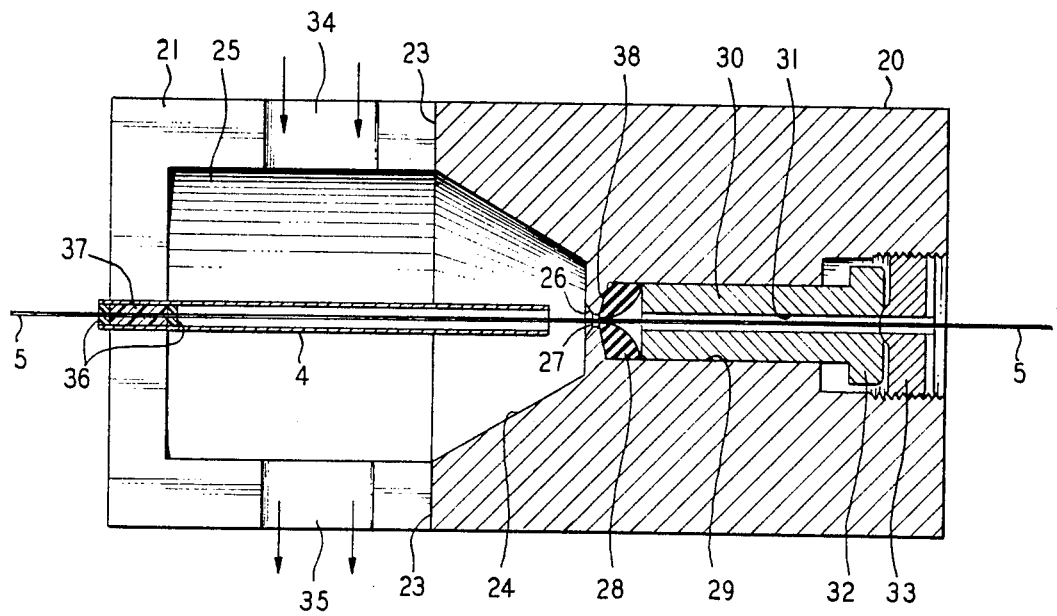
FIG. 3B is a detailed cross section of the molding assembly of FIG. 3A partially disassembled.

The connector body used in the present invention is conveniently and inexpensively manufactured by the use of a molding assembly such as that illustrated in FIGS. 3A and 3B. The double conical socket also lends itself to fabrication by molding.

In FIG. 3A, which is simplified compared to FIG. 3B, precision molding die 20 of approximately cubical outline has a precision machined frustum cavity 24. Precision die 20 is placed in a holder (not shown) together with lower connector-body block 21 and upper connector-body block 22 which are shaped so that a cylindrical cavity 25 for the connector body is also provided.

Referring now to FIG. 3B, some numbers on which correspond with FIG. 3A, precision molding die 20 is shown in cross section. Lower body block 21 is shown exposed by removal of upper body block 22. Die 20 interfaces with body blocks 21 and 22 at plane 23.

Fiber 5 is clamped or otherwise held concentrically in the molding cavity 24, 25. If the molding compound used has a viscosity and flow rate which are such as to deflect or break the fiber during the molding process, additional support, suitably by a metal sleeve 4 is provided.

Supporting sleeve 4 is placed in the cavity as shown and is itself supported in a recess of body block 21 beneath sleeve 4. Optical fiber 5 is threaded through sleeve 4 and guided into orifice 27 by chamfer 26 so that the end of fiber 5 is aligned coaxial with the frustum-shaped die cavity 24 with an angular error suitably less than 1°.

Teflon washers 36 and epoxy cement 37 hold the fiber in place in sleeve 4, or a teflon inner sleeve crimped by sleeve 4 may also be used for this purpose. In another variation in which the fiber, say in a cable, has a thick plastic protective jacket, the sleeve is made large enough to admit the jacket and be crimped thereon, holding the fiber in place.

Precise centering and sealing of fiber 5 in orifice 27 is accomplished by compression of an annulus 28 in a channel 29 by a piston 30 having a head 32 with a bearing surface against which screw 33 is tightened. Screw 33 has a slot for screwdriver adjustment from the exterior of the die. Annulus 28 is previously suitably molded around a concentrically chamfered pin using a molding substance of a silicone rubber or other material able to withstand elevated temperatures and exhibit essentially no decomposition when heated in a confined space. The temperature-vulcanizing potting resin Dow Corning Sylgard 185 is suitable for this purpose, and is commercially available from Dow Corning, Midland, Mich.

Precision chamfer 38 is found to enhance the centering capabilities of annulus 28. Chamfer 38 is made concentric with the tapered surface of cavity 24 to within less than a micron, but the chamfer apex half-angle is noncritical and suitably 75°.

Annulus 28 is compressed until the ultrasonically cleaned fiber 5 may just be admitted along guide chamfer 26, through orifice 27, through annulus 28 and about two centimeters further through a channel 31 of piston 30. If a nylon or other soft coating on the fiber is employed, the coating should previously be stripped at least in the region between sleeve 4 and piston 30 for the most precise centering of the fiber. Then the assembly of upper body block 22, lower body block 21 and precision die 20 is put together and elevated to a transfer molding temperature.

A suitable transfer molding compound is one having good dimensional stability, linear shrinkage, low coefficient of expansion, and abrasion resistance. The molding flow should be soft so as to avoid fiber deflection or breakage. The thermosetting time should be short so as to reduce the cycle time of manufacture. Moldable polyesters and moldable expoxies are convenient and suitable for use as the moldable compound. Inclusion of silica or other mineral fillers stabilizes the molded medium, reduces shrinkage, and improves surface abrasion resistance. The particular molding product used in demonstrating the present invention was Mysol Epoxy Molding Powder, MG6, Mineral Filled, which, as sold by the Hysol Division of Dexter Corporation, Olean, N.Y., refers by label to U.S. Pat. No. 3,484,398.

The MG6 molding powder is preheated for six minutes at 85° C. A vacuum gate 35 is used as a port for evacuating the molding die cavity to 0.01 Torr just prior to admission of the molding compound. Then the MG6 is forced at 410 to 450 psi through 2 mil wide entry gate 34 into the cavity which is at a temperature of 150° C.-160° C. The width of the vacuum gate 35 is 1 mil, which is small enough so that the mineral filled transfer molding compound is admitted at the entry gate but cannot leave through the vacuum gate. The molding compound passing through the entry gate surrounds the optical fiber end as it rapidly fills cavities 25 and 24 and passes along chamfer 26 toward orifice 27, which is closed at the transfer molding temperature by thermal expansion of annulus 28. The molding compound entrains any residual gas in cavity 24 and carries it into the interior of sleeve 4. In this manner, a connector body having a precisely conical frustum mating surface is molded around the end of fiber 5, which in turn is accurately aligned coaxial with the conical frustum mating portion of the molded body. The connector bodies produced had dimensions as follows: 6.34 millimeter cylinder body diameter, 10° taper apex half angle, and 5.6 millimeter taper length. The molded body is cured for 5 minutes, cooled to relax the annulus, removed from the mold, and postcured for 4 hours at 150° C.

It should be clear that many of the details of the molding process are related to the properties of the specific molding compound employed. Thus, while Hysol MG6 was used in demonstrating the invention, the scope of the inventive method is not intended to be limited by the above disclosure of a particular process for transfer molding one substance around the fiber.

Figure 4:
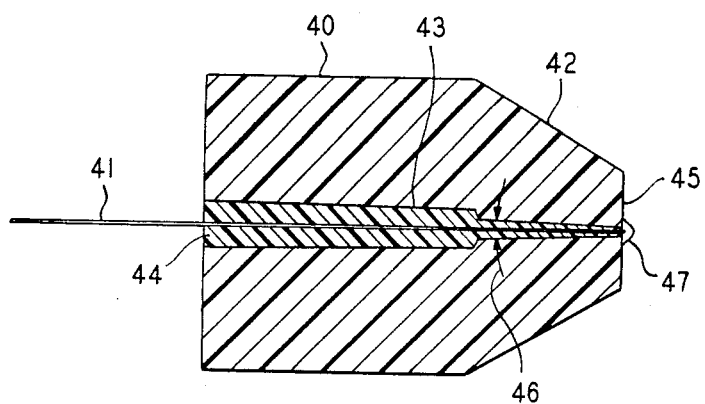
FIG. 4 is a cross sectional view of an alternative form of optical fiber connector subassembly made in accordance with the inventive method.

To additionally suggest the scope of the inventive method, FIG. 4 shows an alternative approach in the manufacturing step of surrounding the end of an optical fiber with a connector body. In this aspect of the method, a connector body 40 having conical mating surface 42 is transfer molded so that it has a channel 43 of tapered shape so that the connector body 40 may be affixed to the fiber 41 in any suitable manner. The channel 43 has a wide receptive opening and guide taper for easy threading insertion of the fiber 41 through it, even in the field. Angle 46 of the portion of the taper near the body tip 45 is chosen small, suitably 2°, so that angular misalignment of the fiber axis is negligible.

The channel 43 is formed by molding the connector body 40, in a way similar to the process illustrated in connection with FIG. 3B, around a tapered mandrel provided in place of sleeve 4. The mandrel has a shape corresponding to the shape of channel 43 and has a wire-like end only slightly larger than the optical fiber diameter. The mandrel end extends through orifice 27 of FIG. 3B and is grasped by annulus 28 during the molding process.

When the molding process is completed, upper body block 22 is removed, precision molding die 20 and connector body 40 are elevated relative to lower body block 21, and connector body 40 is removed from cavity 24 in die 20. The mandrel, which has a major end protruding from the connector body 40 like one end of sleeve 4 of FIG. 1, is then grasped at the major end and extracted from connector body 40.

The connector body 40 is conveniently affixed to optical fiber 41 by means of an adhesive 44 which may be of any appropriate material capable of bonding to the connector body material and the glass fiber. Satisfactory adhesives for an MG6 epoxy connector body and a nylon coated glass fiber include fast curing epoxies, one example of which is Bipax Tra-bond BA 2106T, commercially available from TRA-CON, Inc., Medford, Mass.

If the optical fiber end face has not previously been prepared, the end face is produced smooth and perpendicular to the fiber axis near or at the connector body tip as shown in FIG. 2A. When the connector body is removed from the mold of FIG. 3B, for instance, the end of fiber 5 protrudes from the body tip by a few centimeters. The fiber can be broken off to achieve a flat and perpendicular end face near the tip by using tension, bending and scoring of the fiber according to "Optical Fiber End Preparation for Low-Loss Splices," by D. Globe et al, *Bell System Technical Journal*, Vol. 52, No. 9, November 1973, pp. 1579-1588.

Figure 5:
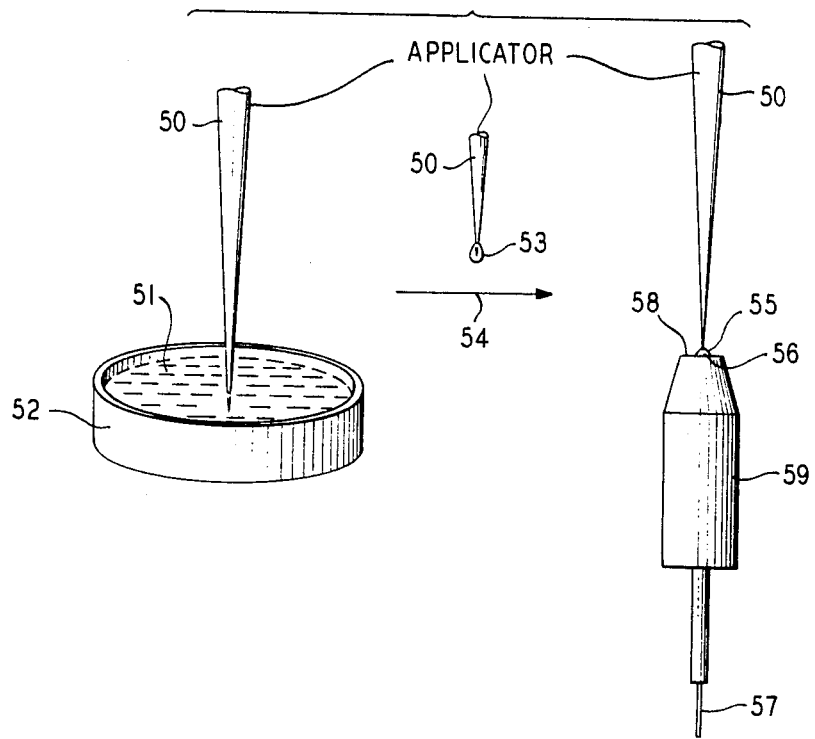
FIG. 5 is a pictorial illustration of steps for applying a clear, flexible index matching dome in accordance with the inventive method.

FIG. 5 shows a method for accomplishing the application of the flexible contact body dome (47 in FIG. 4). Applicator tip 50 is dipped in a flowable liquid contact substance 51 which is held in container 52. Next, applicator tip 50 is retracted so that it holds a drop of the substance 53 which is transferred in the direction of arrow 54. Then drop 53 is applied by applicator tip 50 as contact body dome 55 so that it is located over and covers the end face of end 56 of fiber 57 and at least a portion of tip 58 of connector body 59, to complete the optical connector subassembly. Other methods for applying a contact body may, of course, be readily devised.

The contact body 55 is fashioned in a convex dome shape by application of the drop 53, but other contact body shapes could conceivably be employed. Any shape of contact body which flexes upon touching another contact body so as to form a continuous optical path without air inclusions or other discontinuities is satisfactory.

Substance 51 can be of any suitable type which can be conveniently applied, cures flexible and transparent at a fiber transmission wavelength, preferably with a good refractive index match to the end surface of the fiber employed, and adheres to the connector body tip. Commercially available preparations which are satisfactory include epoxy and silicone rubber compounds.

Among the silicone rubbers the "one-pack" room temperature vulcanizing rubbers offer advantages including no need for mixing of separate packaged products and convenient curing in the humidity of room air. See "Silicone Liquid Rubbers," by J. A. C. Watt, *Chemistry in Britain*, Vol. 6, No. 12, pp. 519–524 (1970). One commercial product which proved satifactory in experiments in Dow Corning 3140 room temperature vulcanizing (RTV) silicone rubber, which cures in 24 to 72 hours at room temperature and 20 percent humidity with no corrosive byproducts. The cured product is well suited for applications in the field, since it remains flexible over the temperature range −65 to 200° C. As cured, 3140 RTV silicone rubber has a refractive index of 1.46, which is an excellent index match to the germania doped low loss quartz fiber of index 1.458 used in the experiments.

Examples of other substances which may find use with fibers having a different refractive index are:
(1) Dow Corning 734 RTV silicone rubber, $n = 1.475$.
(2) Epoxy castgel 904 from Castall, Inc., East Weymouth, Mass., $n = 1.477$.
(3) Duralco 5300 transparent epoxy gel from Cotronics Corp., New York City, $n = 1.523$.

The principles of the present invention may be applied in fabricating a wide variety of optical fiber connector designs. One such design for making optical connection between a rack and a rack mounted module is shown in FIG. 6.

Module connector housing 61 and rack connector housing 62 are affixed to the module and rack (not shown) respectively with rivets or screws through holes, including holes 63 and 64. A transmitter optical fiber 65 surrounded by connector body 66 is plugged into module connector housing 61 through chamfer 67 (see also FIG. 7A); and transmitter fiber 68 surrounded by connector body 69 is plugged into rack connector housing 62 in similar fashion. Receiver optical fiber and connector body subassemblies 65', 66' and 68', 69' plug into chamfers such as 67' in identical manner. When the module is mounted in the rack, beveled guide pins 70 and 73, which are laterally offset from the optical fiber axes, and enclose no part of any light path in FIG. 6, are inserted into guideways 71 and 74 which feature capturing chamfers 72 and 75 respectively. In this manner, a coarse alignment of the optical fiber axes is accomplished. As the guide pins slide into the guideways, they engage spring-loaded pusher pins (not shown, riding inside the guideways), each of which has riding in a slot 82 a lever pin such as 81 for pushing on dust cover 79. The engagement, of course, in no way affects the coarse alignment previously accomplished. Dust cover 79 turns around pivot 80, which is suitably spring loaded. Thus, when the dust cover 79 is raised, the tip 95' and flexible contact body 96' of connector body 69 are exposed in channel 77 near receiving guide cone 76, a similar description applying relative to connector body 69' as well. It is readily apparent that a host of dust cover arrangements and mechanisms are suitable for use in connectors according to invention.

Figure 6:
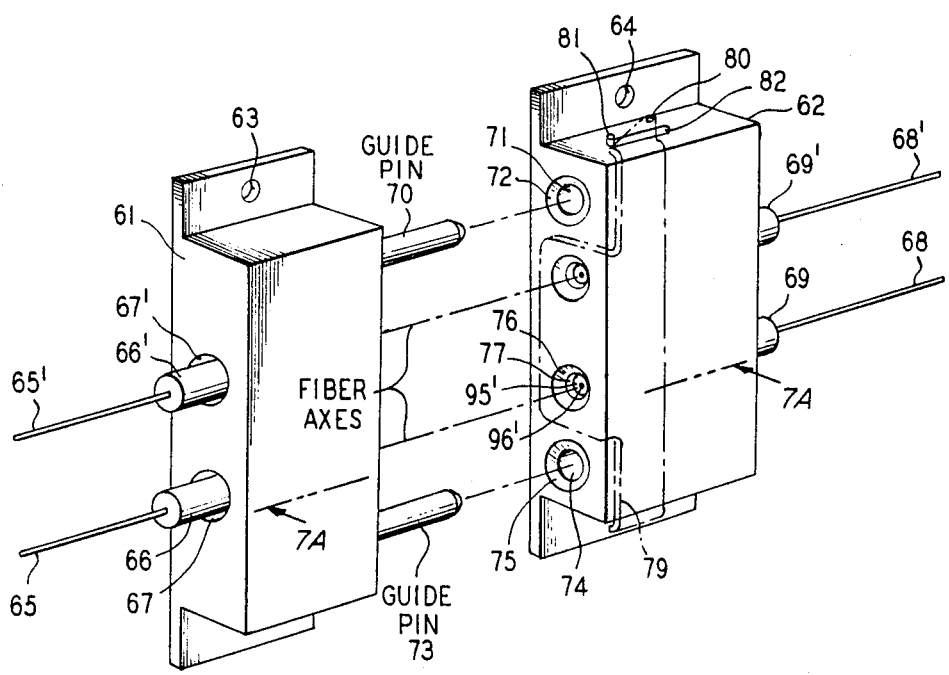
FIG. 6 is a perspective view of a rack-mounted optical fiber connector assembly according to the invention.
Figure 7A:
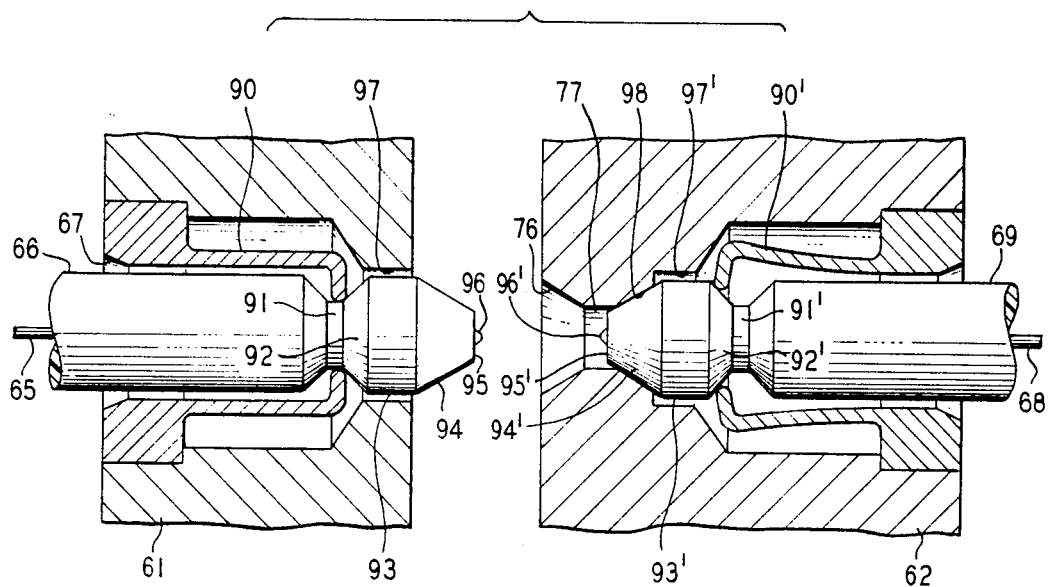
FIGS. 7A and 7B are cross sections of the optical fiber connector assembly of FIG. 6 shown in disconnected and connected conditions respectively.
Figure 7B:
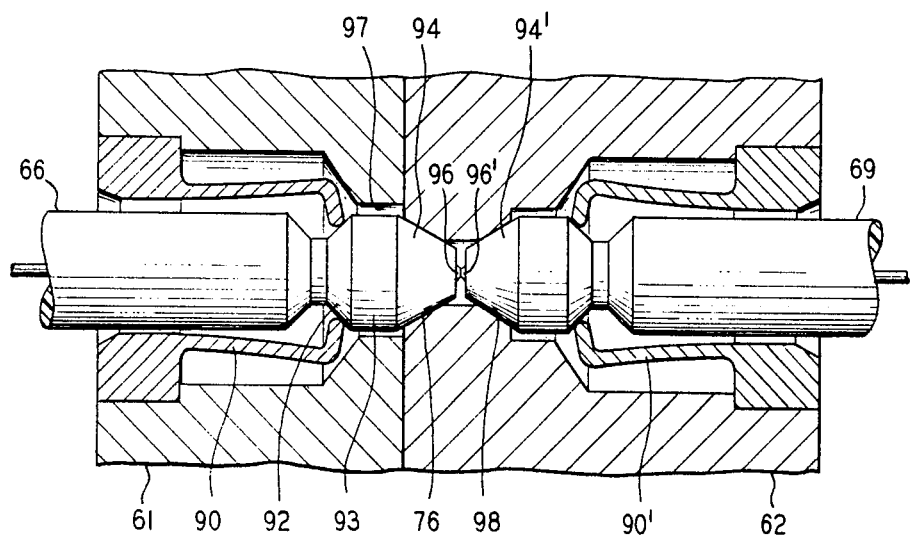

FIGS. 7A and 7B show a cross-section along section plane 7A of FIG. 6 featuring connector bodies 66 and 69 surrounding optical fibers 65 and 68, which are in coarse alignment due to the engagement of the guide pins 70 and 73 as previously described. The connector bodies 66 and 69 have been placed in module connector housing 61 and rack connector housing 62 and are held and retained therein by means of crown springs 90 and 90' respectively at necks 91 and 91' and indents 92 and 92'.

Connector body 69 has its mating cone 94' securely held against receiving cone 98 in channel 97' by the force of crown spring 90' on indent 92'. Tip 95', to which dome 96' adheres, is positioned in channel 77. Connector body 66 is loosely held by crown spring 90 at neck 91 so that cylindrical surface portion 93 is surrounded by channel 97 so that mating cone 94 having tip 95 and dome 96 is prepared for completion of the optical connection.

In FIG. 7B, the optical connection is completed when module connector housing 61 is placed flush against rack connector housing 62. Connector bodies 66 and 69 come together so that clear, flexible domes 96 and 96' touch and flex, completing the optical connection. Axial alignment is accomplished as mating cone 94 is pressed securely against receiving surface 76 by the action of indent 92 being pressed backward against the force of crown spring 90. In this manner the spring retention via the connector bodies holds the contact bodies and fiber ends in the optically connected position. It is to be noted that cylindrical portion 93 is deflected in channel 97 so that the axial alignment may be accomplished in accordance with the invention. Abrasion is minimized since full surface contact is achieved only at the very last instant of the connection.

The frustum-shaped hollowed receiving surfaces 76 and 98 of the connector can advantageously feature radiating lateral grooves as shown on receiving cone 76 of FIG. 7A. The lateral grooves capture dust which may enter the region, and they facilitate a self-cleaning action when the connector body 66 is repeatedly connected and disconnected.

In another feature of the invention, surface 94' of connector body 69 is fused or molded continuous with surface 98 so that housing 62 amounts to a connector body of female type mutually matable disconnectably at receiving surface 76 with the frustum mating surface 94 of connector body 66. It may be found in certain embodiments of the invention that a key-and-slot or other means for limiting rotation of the connector body around its axis is desirable so that distortion of the contact bodies and abrasion of the mating surfaces is minimized.

It is of course to be understood that the embodiments of the present invention hereinabove discussed are merely illustrative of an even wider variety of embodiments useful in practicing the invention. In all cases the scope of the invention is to be interpreted as defined by the appended claims.

What is claimed is:

1. An optical fiber connector assembly comprising: first and second connectors, each of which includes:
   a circular cylindrical frustum-shaped mating portion which tapers from a larger diameter at a point along the body of said connector to a smaller diameter end surface;
   a single optical fiber extending through said connector along the axis of said frustum-shaped mating portion and terminating at said end surface;
   and a transparent, flexible contacting member extending over the end of the fiber; and
   a disconnectable holder for receiving and holding said connectors in linear alignment for coupling between said fibers having:
   first and second opposed, conical frustum-shaped hollowed receiving surfaces for receiving said first and second connectors, respectively, and automatically aligning the fibers terminating therein;
   said connectors being in contact with said respective receiving surfaces, and the flexible contacting members of said connectors being in contact with each other.

2. An optical fiber connector assembly comprising: first and second optical connectors, each of which comprises:
   a connector body including a frustum-shaped mating portion;
   a single optical fiber extending through said connector and terminating at the end surface of said mating portion;
   and disconnectable holding means having opposed receiving surfaces matable, respectively, with the mating portion of said first and second connectors.

* * * * *